(12) United States Patent
Ganesan et al.

(10) Patent No.: US 12,056,698 B2
(45) Date of Patent: Aug. 6, 2024

(54) CAPTURING RELATED EVENTS IN CRYPTOGRAPHICALLY LINKED RECORDS

(71) Applicant: PeerNova, Inc., San Jose, CA (US)

(72) Inventors: Gangesh Kumar Ganesan, Mountain View, CA (US); Benedicto de Souza Franco, Jr., Sunnyvale, CA (US); Alexei Kozlenok, San Jose, CA (US)

(73) Assignee: Peemova, Inc., San Jose, CA (US)

( * ) Notice: Subject to any disclaimer, the term of this patent is extended or adjusted under 35 U.S.C. 154(b) by 232 days.

(21) Appl. No.: 15/696,127

(22) Filed: Sep. 5, 2017

(65) Prior Publication Data

US 2019/0073670 A1  Mar. 7, 2019

(51) Int. Cl.
| | |
|---|---|
| *G06F 21/60* | (2013.01) |
| *G06F 16/27* | (2019.01) |
| *G06F 16/901* | (2019.01) |
| *G06F 21/64* | (2013.01) |
| *G06Q 20/38* | (2012.01) |
| *G06Q 20/40* | (2012.01) |
| *H04L 9/00* | (2022.01) |

(52) U.S. Cl.
CPC .......... *G06Q 20/401* (2013.01); *G06F 16/27* (2019.01); *G06F 16/9014* (2019.01); *G06F 21/602* (2013.01); *G06F 21/64* (2013.01); *G06Q 20/3823* (2013.01); *G06Q 2220/10* (2013.01); *H04L 9/50* (2022.05)

(58) Field of Classification Search
CPC ............ G06Q 20/401; G06Q 2220/10; G06F 16/9014; G06F 21/602
USPC ........................................................ 705/75
See application file for complete search history.

(56) References Cited

U.S. PATENT DOCUMENTS

| | | | | |
|---|---|---|---|---|
| 9,811,659 | B1* | 11/2017 | Asheghian | .......... H04L 63/1416 |
| 2005/0160295 | A1* | 7/2005 | Sumi | .................... H04L 63/1416 |
| | | | | 726/5 |
| 2007/0073985 | A1* | 3/2007 | Wilkes | ................ G06F 11/2064 |
| | | | | 711/161 |
| 2014/0059017 | A1* | 2/2014 | Chaney | ..................... G06F 7/08 |
| | | | | 707/692 |
| 2016/0004711 | A1 | 1/2016 | Soon-Shiong et al. | |

(Continued)

OTHER PUBLICATIONS

PCT International Search Report and Written Opinion, PCT Application No. PCT/US18/48738, Nov. 7, 2018, 16 pages.

*Primary Examiner* — Patrick McAtee
*Assistant Examiner* — Zesheng Xiao
(74) *Attorney, Agent, or Firm* — Fenwick & West LLP

(57) ABSTRACT

In processing a transaction, a data storage system of a processing system stores and updates a progression created for the transaction that represents a timeline of events that occurred related to the transaction. When an event for a transaction occurs, the data storage system identifies data associated with the event. The data storage system creates an event signature for the event by hashing together the identified data. The data storage system identifies a stored progression of the transaction. The data storage system identifies a transaction signature included in the last record added to the progression. The data storage system creates a transaction signature for the event based on the transaction signature of the last record and the event signature created for the event. The data storage system adds a new record to the progression for the event and includes the transaction signature created for the event in the new record.

17 Claims, 9 Drawing Sheets

(56) References Cited

U.S. PATENT DOCUMENTS

2016/0300234 A1   10/2016  Moss-Pultz et al.
2017/0255912 A1*  9/2017  Casebolt ................ G06Q 20/00
2017/0366357 A1* 12/2017  Pattanaik .............. H04L 63/062
2018/0260536 A1*  9/2018  Peza Ramirez ....... G06F 21/105

* cited by examiner

CAPTURING RELATED EVENTS IN CRYPTOGRAPHICALLY LINKED RECORDS

BACKGROUND

1. Field of Art

The present disclosure generally pertains to the storage of data, and in particular to capturing each state of a transaction in a set of cryptographically linked records whose integrity can be verified using mathematical cryptographic proofs.

2. Description of the Related Art

Entities like financial institutions process many transactions on a daily basis. Each transaction involves multiple steps and processes. For example, transferring funds from a first person to a second person may involve verifying the identity of the first person, checking whether the first person has enough funds in his account for the transfer, checking whether the transfer has the characteristics of a money laundering type of transfer, etc. Typically, when storing data on such a transaction, a storage system will store general information for the transaction, such as X amount of funds were transferred from account A to account B on a certain date. However, there is no way to verify that the correct steps were followed in processing the transaction based on the storage of such general information.

Further, the data is stored in storage systems that are designed to be able to reuse storage space. As a result, stored data can be overwritten with new data. However, when storing data for transactions, such as financial transactions the stored data should be immutable in order for users to trust the entities with processing such personal transactions and for users to trust that the information provided by the entities is accurate. Thus, it is necessary to be able to verify and prove that stored data that should be immutable has not been altered.

SUMMARY

A data storage system of a processing system stores multiple progressions that are each created for a different transaction. A progression created for a transaction represents a timeline of events that occurred and are related to the transaction. The progression includes multiple records that are chronologically and cryptographically linked. Each record represents an event related to the transaction.

When an event for a transaction occurs, the data storage system identifies data associated with the event, such as an identification of a process performed, the data that was processed (e.g., input to a function), and the results of the processing (e.g., output of a function). For example, if the transaction is the transfer of funds from a first account to a second account, an event performed may be validating whether the first account has sufficient funds for the transfer. The data identified for the event may include an identifier of the account, an amount of the transfer, a balance of the first account, an identifier of a process executed to make the validation, and the result of the process (i.e., whether the first account has sufficient funds for the transfer).

The data storage system creates an event signature for the event by hashing together the identified data. The data storage system stores the identified data and determines whether a progression already exists for the transaction. If no progression exists for the transaction (e.g., the event is the initiation of the transaction), the data storage system starts a progression for the transaction by creating a genesis record. A genesis record is the first record of a progression. The data storage system includes the event signature in the genesis record.

On the other hand, if a progression already exists for the transaction, the data storage system identifies the last record added to the progression. Specifically, the data storage system identifies a transaction signature included in the last record added to the progression. The data storage system creates a transaction signature for the event based on the transaction signature of the last record and the event signature created for the event. The data storage system adds a new record to the progression and includes the transaction signature created for the event in the new record. Hence, using the transaction signature of the last record to create the transaction signature for the new record allows for records of events related to a transaction to be chronologically and cryptographically linked in a progression.

Further, if the event satisfies a linking rule, the data storage system links the new record to one or more additional progressions of other transactions. A linking rule describes conditions that when satisfied by an event signify that the record created for the event should be linked with one or more records of additional progressions. For example, a linking rule may specify that if an event involves a specific entity, that the new record be linked with records of other progressions for transactions that involve the same entity. Linking the new record with other progressions allows the data storage system to include information on relationships between progressions/transactions.

The data storage system also determines whether the new record satisfies export criteria. Export criteria describe when a copy of a created record should be transmitted to an anchor system. For example, export criteria may indicate that every third record added to a progression be transmitted to the anchor system. If the new record satisfies the export criteria, the data storage system transmits a copy of the record to the anchor system for storage. The anchor system maintains its own copy of records stored by the data storage system. An audit system uses the records stored by the anchor system, which are referred to as export anchors, to determine whether transaction data stored by the data storage system has been modified. If an export anchor does not match its corresponding record of a progression stored by the data storage system (e.g., if the transaction signature of the export anchor does not match the transaction signature of the corresponding record), the audit system determines that data of the data storage system has been tampered with and modified.

Hence, for each transaction, the data storage system maintains a different progression that includes records for events related to the transaction. A record for an event captures the state of a transaction when the event occurred. The data of the record allows for the event to be recreated if needed. By including the records of a transaction in a single progression, it is possible to quickly and efficiently identify the data/records related to the transaction. In contrast, if instead of having a different progression for each transaction, a single progression existed with the records for all transactions processed by the processing system, it would be time consuming and a resource intensive task to identify the records of a transaction in such a large progression. Additionally, by having a different progression for each transaction parallel processing can occur on progressions. For example, one process can be using a first progression while at the same time another process uses a second progression. Further, by exporting records to an anchor system, the data stored by the data storage system can be audited using mathematical cryptographic proofs for purposes of ensuring that stored data that should be immutable has not been modified.

Figure 1A:
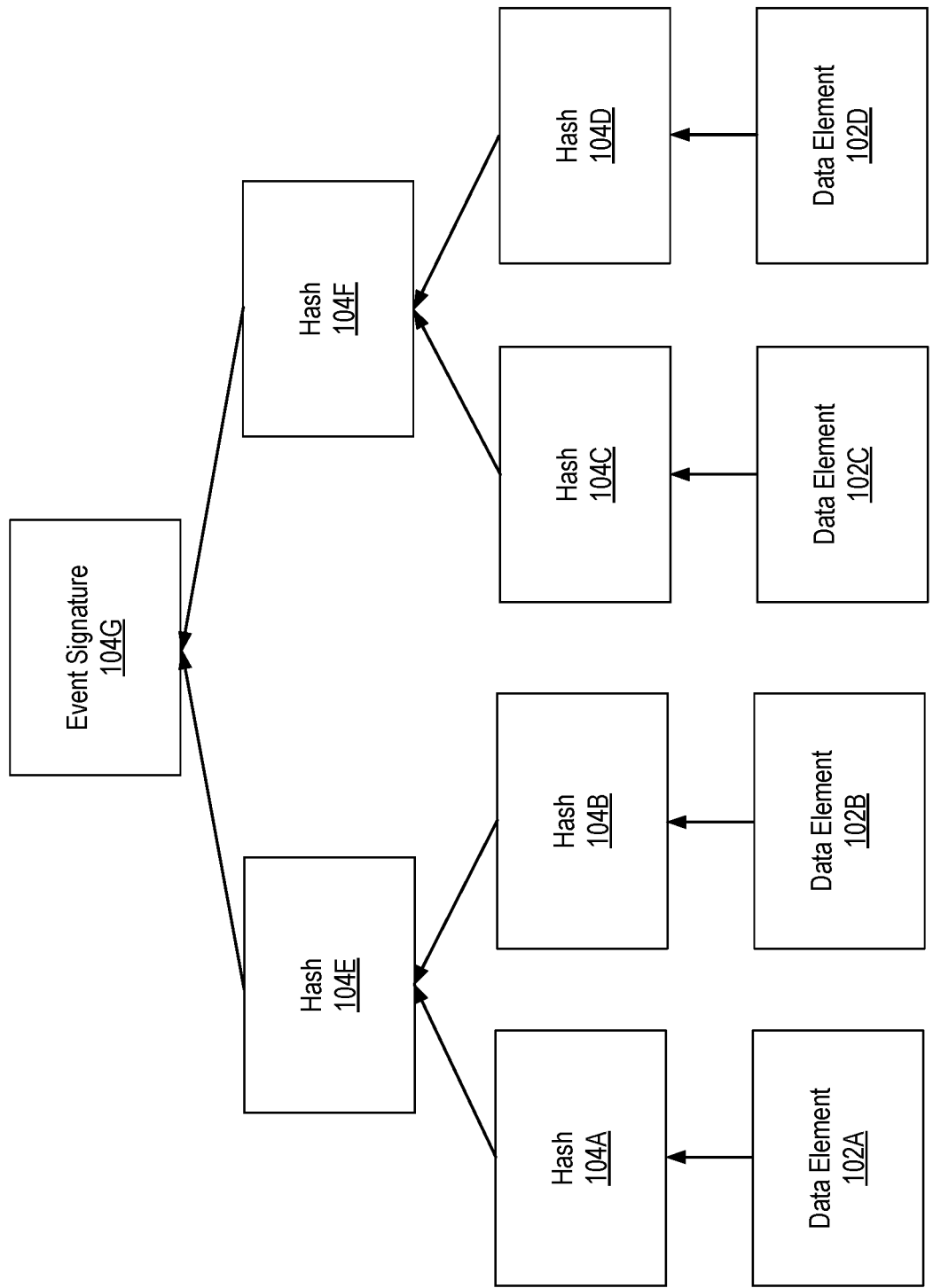
FIGS. 1A-1E are examples of how progressions are stored in accordance with one embodiment.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

The figures use like reference numerals to identify like elements. A letter after a reference numeral, such as "102A," indicates the text refers specifically to the element having that particular reference numeral. A reference numeral in the text without a following letter, such as "102," refers to any or all of the elements in the figures bearing that reference numeral (e.g., "102" in the text refers to reference numerals "102A," "102B," "102C" and/or "102D" in the figures).

DETAILED DESCRIPTION

FIGS. 1A-1E are examples of how progressions are stored in accordance with one embodiment. A progression is created for each transaction processed by a processing system. A transaction is one or more related events performed for the purpose of achieving a certain result. For example, a transaction may be transferring funds from a first account to a second account. The transfer of funds from the first account to the second account may involve events such as validating that the first and second accounts exist, verifying that the user that initiated the transfer is authorized to make the request, determining whether the first account has sufficient funds for the transfer, determining whether the amount of the transfer exceeds an established limit, determining whether the transfer has the characteristics of a money laundering type of transfer, etc.

A progression created for a transaction represents a timeline of events that occurred and are related to the transaction. A progression of a transaction includes multiple records that are chronologically and cryptographically linked. Each record in a progression represents an event related to the transaction and captures the state of the transaction when the event occurred. Continuing with the example of transferring funds from the first account to the second account, the progression created for this transaction includes a record for each of the events mentioned above that occurred for the transaction and the records are cryptographically linked in the order in which the events occurred.

When an event for a transaction occurs, a data storage system of the processing system identifies data associated with the event. FIG. 1A illustrates the data identified for the event comprised of data elements 102A, 102B, 102C, and 102D. For example, if the transaction is the purchase of stock by a user, the event may be verifying whether the user that initiated the request is authorized to make such a request. In this example, data element 102A may correspond to the date and time when the event occurred, data element 102B corresponds to an identifier of the user, data element 102C corresponds to an identifier (e.g., process ID) of the process executed to verify whether the user is authorized to make the stock purchase request, and data element 102D corresponds to the result of the process (whether the user is authorized to make the stock purchase request).

A hash function is applied to each data element 102A, 102B, 102C, and 102D to create hashes 104A, 104B, 104C, and 104D, respectively. Hash 104A corresponds to data element 102A, hash 104B corresponds to data element 102B, hash 104C corresponds to data element 102C, and hash 104D corresponds to data element 102D. In one embodiment, the data storage system stores each data element 102A-102D in a key-value database using its corresponding hash 104A-104D as the key.

Additionally, the data storage system creates an event signature for the event based on hashes 104A-104D. To create the event signature, the data storage system pairs up the hashes 104A-104D of the data elements and hashes each pair together by applying another hash function to each paired hashes 104A-104D. In this example, hash 104A is paired with hash 104B and another hash function is applied to the paired hashes and the resulting hash is hash 104E. Additionally, hash 104C is paired with hash 104D and another hash function is applied to the paired hashes and the resulting hash is hash 104F. Finally, hashes 104E and 104F are paired and hashed together to get event signature 104G. Event signature 104G is a root hash of a Merkle tree. Hence, the event signature is created by applying a binary Merkle tree hashing algorithm to hashes 104A-104D.

Figure 1B:
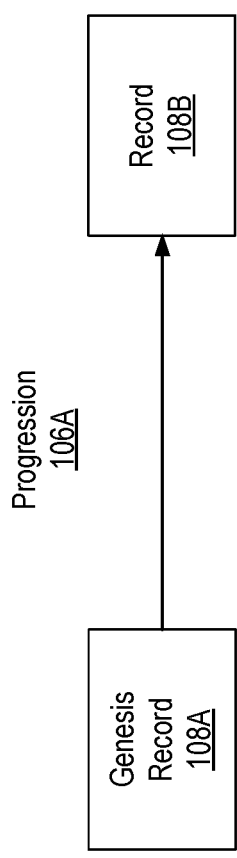

The data storage system searches multiple stored progressions for a progression created for the transaction. Since a different progression exists for each transaction, the data storage system identifies the one progression that corresponds to the transaction. In this example, the data storage system identifies progression 106A which is illustrated by FIG. 1B. The progression 106A already includes genesis record 108A and record 108B which each represents an event that has already occurred for the transaction. The genesis record 108A is the first record in the progression 106A and represents the first event that occurred for the transaction. Record 108B represents the second event that occurred for the transaction. In one embodiment, genesis record 108A and record 108B each includes an event signature created from hashing together the data of the corresponding event represented by the record 108 (e.g., using a Merkle tree hashing algorithm as in FIG. 1A). Further, records 108A and 108B are cryptographically linked by record 108B including a transaction signature created by hashing the event signature of the event represented by record 108B with transaction signature of the genesis record 108A. Since genesis record 108A is the first record 108 in the progression, the transaction signature of genesis record 108A is the event signature created for the corresponding event of the record 108A.

Figure 1C:
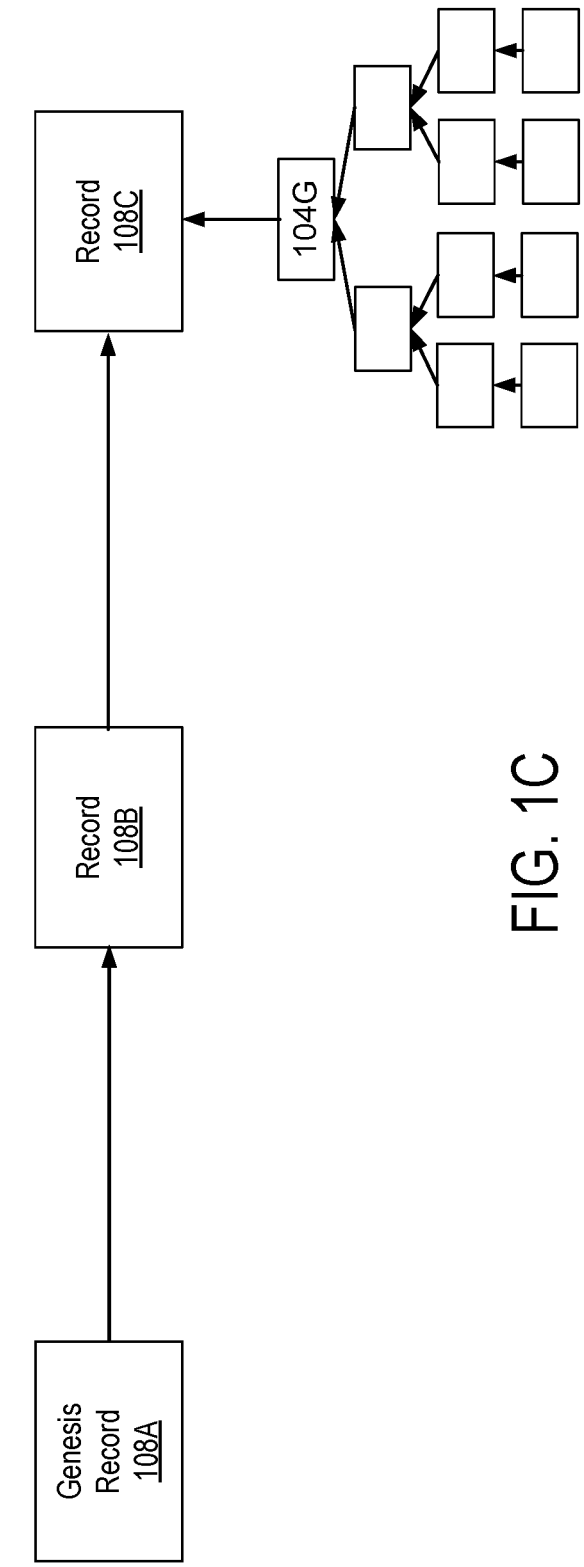

FIG. 1C illustrates that for the event for which event signature 104G is created in FIG. 1A, the data storage system adds record 108C to the progression 106A since its next event of the transaction. The data storage system creates a transaction signature for the event by hashing event signature 104G with the transaction signature included in record 108B. The data storage system includes the created transaction signature in record 108C. As a result, the transaction signature cryptographically links record 108C to record 108B. In one embodiment, the data storage system additionally includes in the record 108C hashes 104A-104F and the event signature 104G.

Hence, the data storage system adds record 108C to the progression 106A of the transaction in order to capture the state of the transaction when the corresponding event occurred. Since progression 106A only includes records 108 for events related to the transaction and the records 108 are chronologically linked, the records 108 represent the timeline of events that have occurred related to the transaction. As a result, a progression is created for a single transaction and captures the event information for the transaction.

Figure 1D:
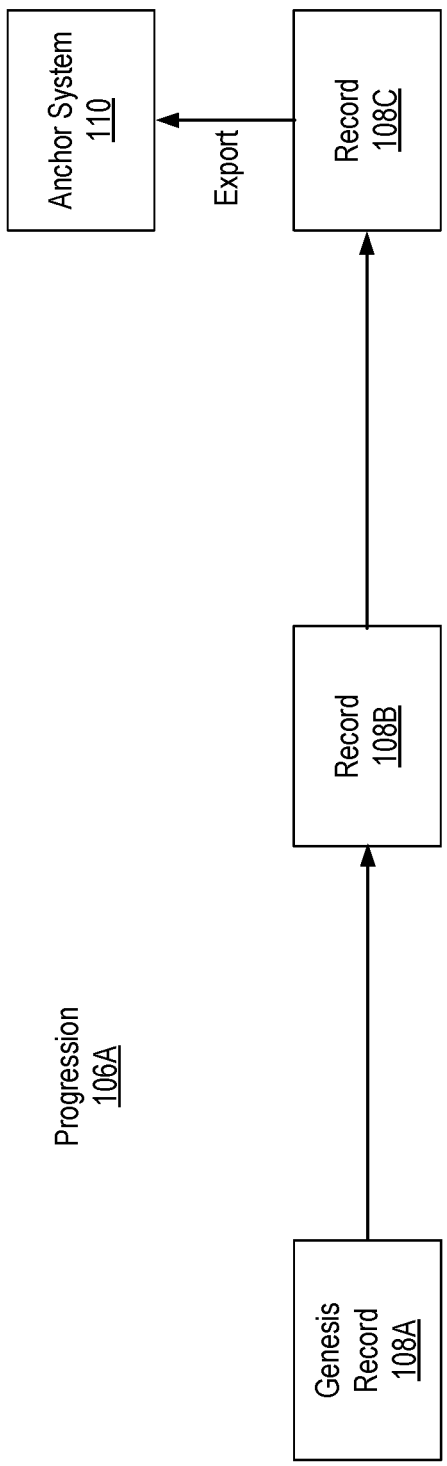

As illustrated in FIG. 1D, in this example a copy of record 108C is exported by the data storage system to an anchor system 110 for storage. The record is exported to the anchor system 110 based on the record 108C satisfying export criteria. Export criteria describe when a copy of a created record should be transmitted to the anchor system 110. For example, the export criteria may indicate that every other record added to a progression is exported to the anchor system 110 or that records created for specific events be exported to the anchor system 110. The anchor system 110 is separate from the data storage system and maintains its own copies of records stored by the data storage system. The copies of records received from the data storage system and stored by the anchor system 110 are referred to as export anchors.

The data stored by the data storage system is intended to be immutable. An audit system uses the export anchors stored by the anchor system 110 to verify that the data stored by the data storage system has not been modified. During an audit, the audit system will compare one or more export anchors stored by the anchor system 110 with corresponding records of the data storage system. If an export anchor does not match its corresponding record, the audit system determines that data stored by the data storage system has been tampered with and modified, for example, by an unauthorized malicious entity.

Figure 1E:
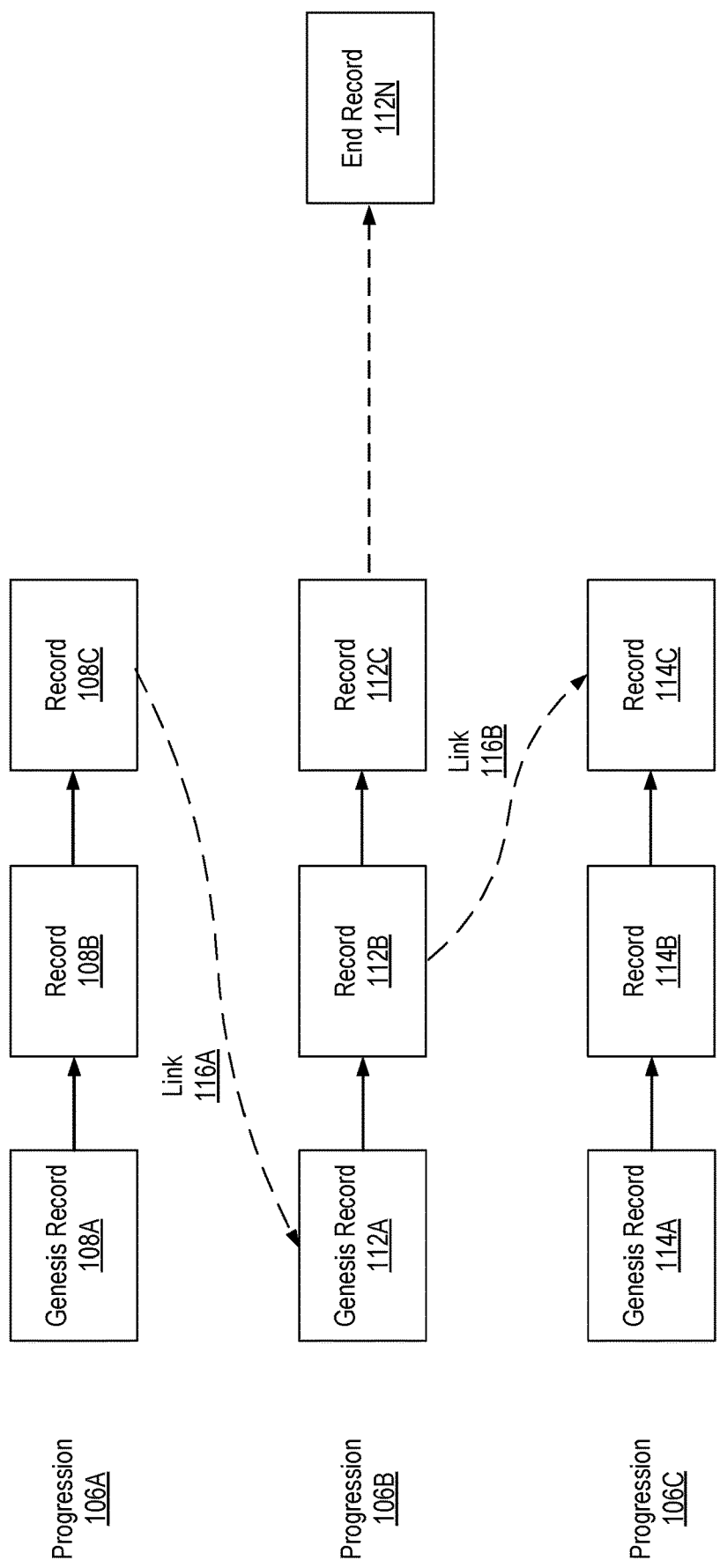

FIG. 1E illustrates progressions 106B and 106C in addition to progression 106A. Progressions 106B and 106C each represents events that have occurred for a corresponding transaction. The transaction of progression 106B and the transaction of progression 106C are each different from the transaction of progression 106A and from each other. For example, progression 106A may represent events that have occurred for a transaction to transfer funds from a first account to a second account, progression 106B represents events that have occurred for a transaction to transfer funds from the first account to a third account, and progression 106C represents events that have occurred for a transaction to purchase stock.

Progression 106B includes genesis record 112A and records 112B through 112N. Progression 106C includes genesis record 114A, record 114B, and record 114C. Record 112N of progression 106B is labeled as an end record because the event represented by end record 112N is the last event of the transaction corresponding to progression 106B. Hence, for the last event of a transaction, the record created for the event is labeled as an end record. In one embodiment, no additional records can be added to a progression after an end record is created. Since progressions 106A and 106C do not include an end record, it signifies that the last event of the corresponding transactions has not yet occurred and additional records will be added to the progressions 106A and 106C.

Continuing with the example from above where progression 106B represents events that have occurred for a transaction to transfer funds from the first account to a third account, assume that the last event of the transaction is to provide a receipt to the user that initiated the request indicating that the funds have been transferred to the third account. When the event occurs, the data storage system creates record 112N. Since record 112N represents the last event of the transaction, the data storage system labels record 112N as an end record.

FIG. 1E further illustrates a link 116A between record 108C of progression 106A and genesis record 112A of progression 106B. FIG. 1E illustrates an additional link 116B between record 112B of progression 106B and record 114C of progression 106C. A link 116 between two progressions 106 is used to show a relationship between the corresponding transactions. When the data storage system adds a record to a progression 106, the data storage system determines whether the event represented by the record satisfies a linking rule. A linking rule describes conditions that, when satisfied by an event, signifies that the record created for the event should be linked with one or more additional progressions to show the relationship between the corresponding transactions. If the event represented by the record satisfies a linking rule, the data storage system links the record with another record specified or described by the rule. The data storage system links the record with the other record by including in the record the storage location of the other record.

Hence, in FIG. 1E, record 108C is linked to genesis record 112A based on the event of record 108C satisfying a linking rule. Similarly record 112B is linked to record 114C based on the event of record 112B satisfying another linking rule. For one example, event logs from multiple different components of an Equities Trading Payment System can be captured in Progressions. Events and the event logs from Broker/Dealers, Securities Clearinghouses and FedWire/CHIPS (Clearing House Interbank Payment Systems) systems may be captured and stored as events that are cryptographically linked to form a Payment Progression. For another example, in the case of a multi-party Supply Chain Application, event logs from multiple vendors and suppliers may be captured as events that are cryptographically linked to form a Supply Chain Progression.

Although the data storage system is described herein as having a different progression for each transaction, the data storage system may also store progressions for other entities or objects. For example, record 112B may be created when a process is executed as part of the transaction of progression 106B and record 112B is linked with record 114C because progression 106C represents the instructions of the process. Records 114A, 114B, and 114C may each represent a different set of instructions of the process. As another example, progression 106C may be created for a user and records 114A, 114B, and 114C represent different transactions related to the user.

Figure 2:
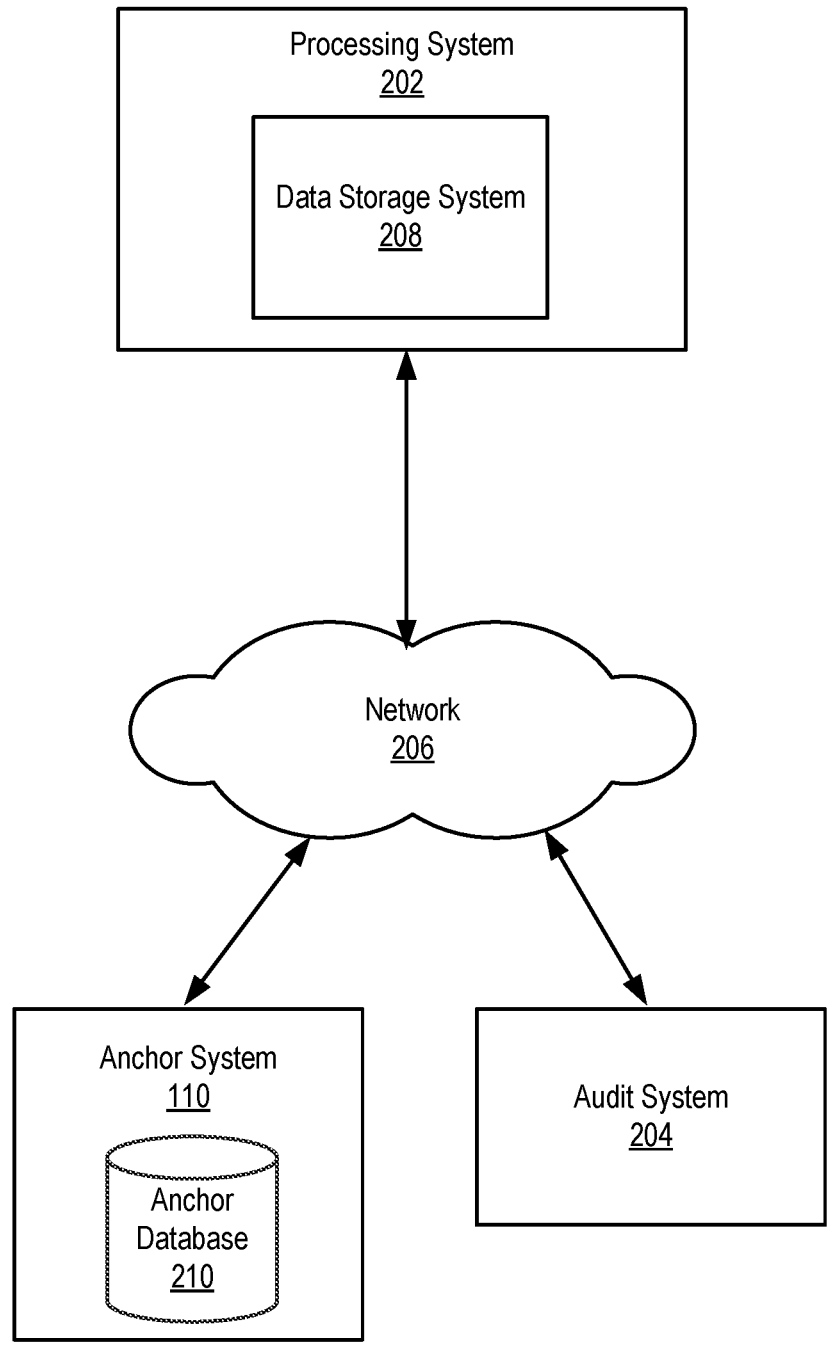
FIG. 2 is a block diagram of a processing environment in accordance with one embodiment.

FIG. 2 is a detailed view of a data storage environment 200 in accordance with one embodiment. The data storage environment 200 includes processing system 202, anchor system 110, and audit system 204 connected via a network 206. Although the illustrated environment 200 includes only a select number of each entity, other embodiments can include more or less of each entity.

The processing system 202 is a computer system that processes transactions. A transaction is one or more related events performed for the purpose of achieving a certain result. In one embodiment, the processing system 202 is the computer system of a financial institution that processes financial transactions. For example, the financial transactions may be one or more of the followings: transfers between financial accounts, security trades, purchases of goods or services, payments, and loan underwriting. The processing system 202 may process transactions in collaboration with other systems, such as other processing systems 202.

Processing a transaction involves multiple steps and the execution of multiple processes. For example, transferring funds from a first account to a second account may involve, validating that the first and second accounts exist, verifying that the user that initiated the transfer is authorized to make the request, determining whether the first account has sufficient funds for the transfer, determining whether the amount of the transfer exceeds an established limit, determining whether the transfer has the characteristics of a money laundering type of transfer, etc. The processing system 202 includes a data storage system 208 that stores data for each event of a transaction. The processing system 202 stores a different progression for each transaction. A progression is comprised of multiple records that are chronologically and cryptographically linked. Each record of a progression represents an event related to the transaction of the progression. In the embodiment where multiple processing systems 202 collaborate to process transactions, each processing system 202 may store a subset of records of a progression or progressions that are linked to other progressions stored by another processing system 202. Further, details regarding the data storage system 208 are provided below with reference to FIG. 3.

The anchor system 110 maintains anchors used for auditing the data storage system 208 to verify that data stored by the data storage system 208 has not been modified. The data stored by the data storage system 208 is intended to be immutable. The anchor system 110 and audit system 204 in combination confirm that data stored by the data storage system 208 has not been modified. When the data storage system 208 adds a record for an event to a progression of a transaction, the data storage system 208 transmits a copy of the record to the anchor system 110 as an export anchor if the event satisfies export criteria. The anchor system 110 includes an anchor database 210 that stores export anchors received from the data storage system 208. The data storage system 208 has no access to the anchors stored by the anchor system 110. Since the anchors stored by the anchor system 110 are used to audit the data storage system 208, the anchor system 110 is maintained separate from the data storage system 208 (e.g., a different entity manages the anchor system 110). Even if data storage system 208 has a security breach, the data stored by the anchor system 110 will not be susceptible to being modified.

When the anchor system 110 receives an export anchor from the data storage system 208, the anchor system 110 stores the export anchor in the anchor database 210. In one embodiment, with the export anchor the anchor system 110 stores as metadata an identifier that can be used to identify the corresponding record stored by the data storage system 208. The identifier may be, for example, a reference number or a storage location of the record. In one embodiment, if the anchor database 210 includes one or more other anchors associated with the same transaction as that of the received export anchor, the anchor system 110 links the received export anchor with the one or more other anchors associated with the same transaction.

In one embodiment, when the anchor system 110 receives an export anchor from the data storage system 208, the anchor system 110 also creates an import anchor using the export anchor. The anchor system 110 creates the import anchor by hashing the export anchor with information associated with the time at which the import anchor is created, such as the present time (e.g., current date and/or current clock time). Since the import hash is created using information associated with the present time at which the import anchor is created, it makes it infeasible for the import anchor to be recreated in the future. Hence, the import hash provides proof that it was created on the current date and/or time.

In one embodiment, to create the import anchor the anchor system 110 requests a time stamp with the current date and/or time from a third party entity. The third party entity is a trusted time stamping authority. The anchor system 110 receives the time stamp signed by the time stamping authority and hashes the time stamp with the export anchor to create the import anchor. In another embodiment, the anchor system 110 has a copy of the export anchor stored in a Bitcoin blockchain. The anchor system 110 receives the block number of the block in which the copy was stored in the blockchain and hashes the block number with the export anchor to create the import anchor. In another embodiment, the anchor system 110 creates the import anchor by hashing the export anchor with information from a current publication. For example, the export anchor may be hashed with the text from the front page of a newspaper published on that day.

The anchor system 110 stores the import anchor in the anchor database 210. Additionally, the anchor system 110 transmits the import anchor to the data storage system 208. The data storage system 208 adds a new record to the progression that includes the export anchor. The data storage system 208 includes the import anchor in the new record. Additionally, the data storage system 208 identifies the transaction signature included in the record added to the progression prior to the new record and hashes it with the import anchor to create a transaction signature for the new record corresponding to the import anchor. The created transaction signature is included in the new record. Adding the import anchor to the progression provides proof of time and makes it infeasible for the progression to be recreated at a later time, for example, by a malicious entity trying to modify the data stored by the data storage system 208. In one embodiment, an identifier of the record added to the progression based on the import anchor is stored as metadata with the import anchor in the anchor database 210.

The audit system 204 is a computer system with the capabilities to audit the data storage system 208 to determine if data stored by the data storage system 208 has been altered. The audit system 204 may be, for example, the computer system of a government agency or some other trusted third-party auditor. The audit system 204 may audit the data storage system 208 periodically or upon request from a user of the audit system 204. The audit system 204 has access to the data stored by the data storage system 208 in order to be able to audit the data storage system 208. Permission to access the data is granted by the data storage system 208.

When the audit system 204 determines to audit the data storage system 208, the audit system 204 retrieves export and import anchors from the anchor database 210. In one embodiment, the audit system 204 retrieves all of the anchors stored in the anchor database 210. In another embodiment, the audit system 204 retrieves select anchors (a subset of the stored anchors). For example, the audit system 204 may retrieve a random sampling of anchors or anchors associated with a specific progression/transaction.

For each export anchor retrieved, the audit system 204 obtains the corresponding record stored by the data storage system 208. In one embodiment, the record is identified using an identifier of the record stored with the export anchor in the anchor database 210. The audit system 204 compares the export anchor with the identified record. If the export anchor and the identified record do not match, the audit system 204 determines that data stored by the data storage system 208 has been tampered with and modified. At the very least, the record has been modified.

In one embodiment, at a first stage the audit system 204 compares a transaction signature included in the export anchor in the anchor database 210 with a transaction signature included in the identified record in the progression stored in the data storage system 208. If the signatures do not match, the audit system 204 determines that data stored by the data storage system 208 has been modified. However, as described above with reference to FIGS. 1C and 1D, the export anchor and the identified record include hashes used to create their corresponding transaction signatures (e.g., hashes of the Merkle tree). Based on these hashes, the audit system 204 can go further and determine the specific data that was modified.

For example, returning to FIG. 1A, if the transaction signature included in the export anchor does not match with the transaction signature included in the identified record, the audit system 204 can compare hash 104E of the identified record to the corresponding hash included in the export anchor and also compare hash 104F with its corresponding hash. If hash 104E does not match the corresponding hash, the audit system 204 determines that data elements 102A and/or data element 102B were modified. Further, the audit system 204 can compare hashes 104A and 104B in the identified record with the corresponding hashes of the export anchor. If hash 104A does not match its corresponding hash, the audit system 204 determines that data element 102A has been modified. The audit system 204 can verify that data element 102 has been modified, by retrieving the stored data element 102A using as a key the hash included in the export anchor that corresponds to hash 104A. The same hash function used to create hash 104A is applied to the retrieved data element 102A. If the result of applying the hash function does not match the hash included in the export anchor, the audit system 204 determines that data element 102A has been modified. Similarly if hash 104B does not match its corresponding hash in the export anchor, the audit system 204 determines that data element 102B has been modified.

Additionally, for each import anchor retrieved by the audit system 204 from the anchor database 210, the audit system 204 identifies the corresponding record stored with the data storage system 208 using an identifier of the record stored with the import anchor. The audit system 204 compares the import anchor included in the record of the progression stored in the data storage system 208 with the import anchor retrieved from the anchor database 210. If the import anchors do not match, the audit system 204 determines that data stored by the data storage system 208 has been modified.

The network 206 represents the communication pathways between the processing system 202, the anchor system 110, and the audit systems 204. In one embodiment, the network 206 is the Internet and uses standard communications technologies and/or protocols. The network 206 can also utilize dedicated, custom, or private communications links that are not necessarily part of the Internet. The network 206 may comprise any combination of local area and/or wide area networks, using both wired and wireless communication systems. In one embodiment, information exchanged via the network 206 is cryptographically encrypted and decrypted using cryptographic keys of the senders and the intended recipients.

Figure 3:
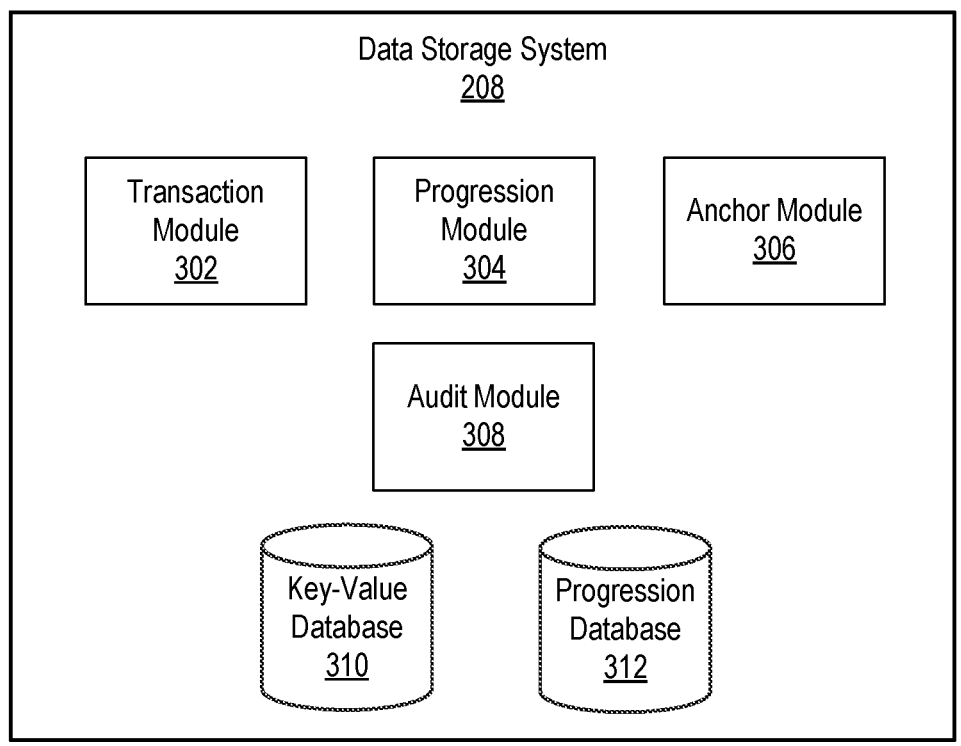
FIG. 3 is a block diagram of a data storage system in accordance with one embodiment.

FIG. 3 is a block diagram of the data storage system 208 in accordance with one embodiment. The data storage system 208 includes a transaction module 302, a progression module 304, an anchor module 306, an audit module 308, a key-value database 310, and a progression database 312. Those of skill in the art will recognize that other embodiments of the data storage system 208 can have different and/or other components than the ones described here, and that the functionalities can be distributed among the components in a different manner.

The transaction module 302 stores data for an event. When an event for a transaction occurs, the transaction module 302 receives data from the processing system 202 for the event. An event may be, for example, a process executed as part of the transaction, a function applied to the transaction data or any other step of the transaction. The identified data may include the data processed, data input into a function, an identifier of the process/function applied, and the results of the process/function.

The received data is comprised of various data elements. In one embodiment, for each data element, the transaction module 302 applies a hash function to the data element to obtain a hash for the data element. The hash function is a one-way function that makes it infeasible to recover the data element from the data signature. In one embodiment, the hash function applied is an SHA-256 (Secure Hash Algorithm-256) function. In one embodiment, the transaction module 302 stores each data element in the key-value database 310 using the hash of the data element as the key. The same key can be used to retrieve the data element from the key-value database 310.

In one embodiment, the transaction module 302 applies a Merkle tree hashing algorithm to the hashes of the data elements to create an event signature for the event, for example, as illustrated with respect to FIG. 1A. The root node of the Merkle tree is the event signature for the event. Since the event signature is created using the data of the event, the event signature is unique to the event. The transaction module 302 provides the event signature to the progression module 304 for creating a record for the event. In one embodiment, the transaction module 302 also provides to the progression module 304 any other hashes used to create the event signature (e.g., the hashes of the Merkle tree).

The progression module 304 creates records for events of transactions. When the progression module 304 identifies an event signature created by the transaction module 302 for an event of a transaction, the progression module 304 creates a transaction signature for the event to cryptographically link the event with other events of the transaction. To create the transaction signature, the transaction module 302 searches the progression database 312 for a progression associated with the transaction. The progression database 312 includes the records of each progression stored by the data storage system 208.

If the progression database 312 does not include a progression for the transaction, the transaction module 302 determines to use the event signature as the transaction signature for the event. The progression module 304 creates a genesis record for the event which is the start of a new progression for the transaction. In the genesis record the progression module 304 includes the event signature/transaction signature. In one embodiment, the progression module 304 also includes in the genesis record other hashes used by the transaction module 302 to create the event signature/transaction signature. Additionally, the progression module 304 includes an identifier of the transaction in the genesis record.

On the other hand, if the progression database 312 includes a progression for the transaction, the progression module 304 retrieves from the progression database 312 the records of the progression. The progression module 304 identifies the transaction signature included in the last record added to the progression. The progression module 304 hashes the identified transaction signature of such last record with the event signature to create the transaction signature for the event associated with the event signature. The progression module 304 adds a new record to the end of the progression and includes the created transaction signature in the new record to cryptographically link the new record to the previous last record of the progression.

For a newly created record of a progression, the progression module 304 determines whether to link the record with records of other progressions corresponding to other transactions. The progression module 304 includes multiple linking rules. Each linking rule describes conditions that when satisfied by an event signifies that the record of the event should be linked with records of other progressions. The linking rule further specifies the progressions and records with which to link the record when the conditions are satisfied. In one embodiment, the linking rules are created by system administrators of the data storage system 208. If the event represented by the newly created record satisfies the conditions of a linking rule, the progression module 304 identifies in the progression database 312 one or more records of other progressions with which to link the newly created record according to the linking rule. The progression module 304 links the newly created record with the identified one or more records of other progressions. In one embodiment, the progression module 304 links the newly created record with the identified one or more records of other progressions by including in the newly created record the storage location of each of the one or more records in the progression database 312.

The progression module 304 also determines whether the event of the created record is the last event of the transaction. In one embodiment, the progression module 304 makes the determination based on data received by the transaction module 302 for the event which indicates when it is the last event for the transaction. In another embodiment, the genesis record of the progression includes a description or identifier of the last event for the corresponding transaction. If the event of the created record satisfies the description or is associated with the identifier included in the genesis record, the progression module 304 determines that the event is the last one of the transaction. Still another way for the progression module 304 to determine if an event or event log is the last event of that particular progression may be by identifying some meta-data present in the event log that is received, such as a time-stamp.

If the event is the last event of the transaction, the progression module 304 labels the created record as an end record. In one embodiment, once the progression module 304 labels a record of a progression as an end record, the progression module 304 will not add additional records to the progression because there should be no additional events for the transaction of the progression. The progression module 304 stores the created end record in the progression database 312.

The anchor module 306 exports records to the anchor system 110. When the progression module 304 creates a record for an event, the anchor module 306 determines whether the record satisfies export criteria. The export criteria describe when a copy of a created record should be transmitted to the anchor system 110. In one embodiment, the export criteria are established by the system administrators of the data storage system 208. If the record satisfies the export criteria, the anchor module 306 transmits a copy of the record to the anchor system 110 as an export anchor.

In one embodiment, when an export anchor is transmitted to the anchor system 110, the anchor module 306 receives from the anchor system 110 an import anchor created based on the export anchor. Based on receiving the import anchor, the anchor module 306 retrieves from the progression database 312 the records of a progression that includes the record transmitted to the anchor system 110 as an export anchor. The anchor module 306 identifies the transaction signature of the last record added to the progression. The anchor module 306 hashes the transaction signature with the import anchor to create a new transaction signature. The anchor module 306 adds a new record to the progression and includes the created transaction signature in the new record. The anchor module 306 also includes the import anchor in the new record. The anchor module 306 stores the new record in the progression database 312.

In one embodiment, when the import anchor is received, if the progression includes an end record, the anchor module 306 notifies the anchor system 110 that the import anchor cannot be included in the progression because no additional records can be added to the progression. In another embodiment, when the import anchor is received, if the progression includes an end record, the anchor module 306 makes an exception for the import anchor and adds a new record to the progression to include the import anchor. The anchor module 306 labels the new record as an end record.

The audit module 308 processes audit requests from the anchor system 110. When the audit system 204 requests specific records for comparing with anchors, the audit module 308 identifies the records in the progression database 312 and transmits the records to the audit system 204. If the audit system 204 requests records associated with a transaction, the audit module 308 searches the progression database 312 for a genesis record associated with the transaction. When the genesis record associated with the transaction is identified, the audit module 308 retrieves the identified genesis record along with other records that are part of the same progression as the genesis record. The audit module 308 transmits the retrieved records to the audit system 204.

In one embodiment, the audit system 204 is allowed to retrieve data elements stored in the key-value database 310. If a request for a data element is received, the audit module 308 identifies a key included with the request. The audit module 308 uses the key to retrieve the requested data element from the key-value database 310 and transmits the data element to the audit system 204. The audit system 204 may request data elements, for example, to recreate an event of a record. For example, if an event for a transaction included applying a function to data, the data elements stored in the key-value database 310 for the event may include an input provided to a function, an identifier of the function, and the output of the function. The audit system 204 requests the data elements stored by the key-value database 310 to recreate applying the function to the data and verify that the event was performed properly.

Figure 4A:
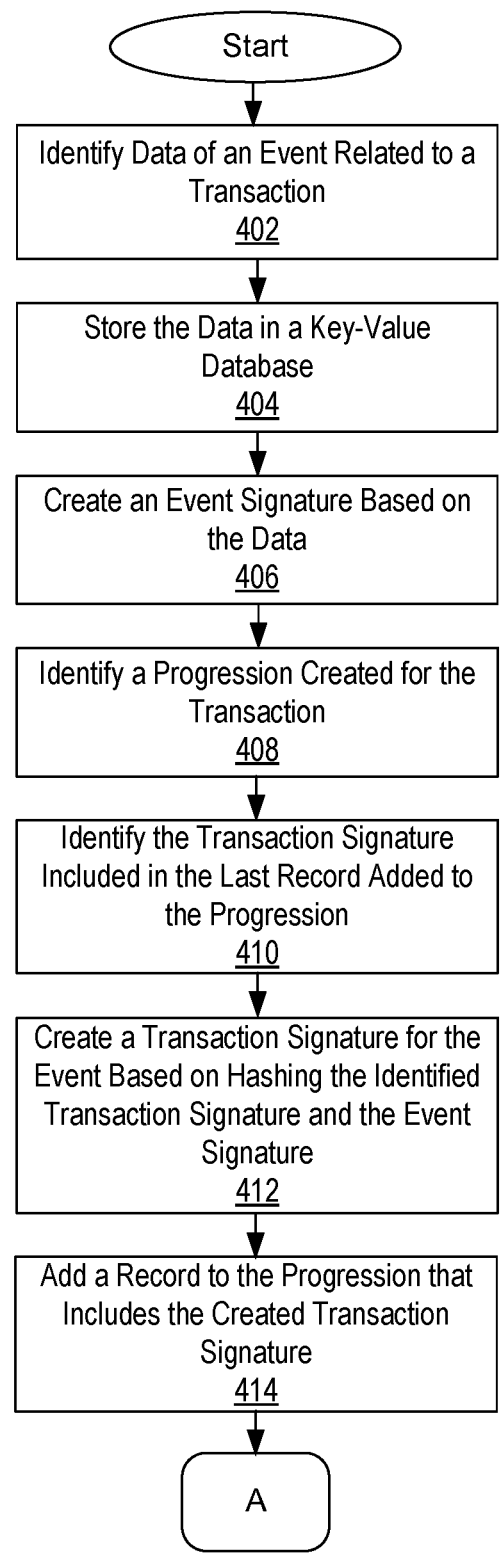
FIGS. 4A and 4B illustrate a flowchart of a process for storing data of an event related to a transaction in accordance with one embodiment.
Figure 4B:
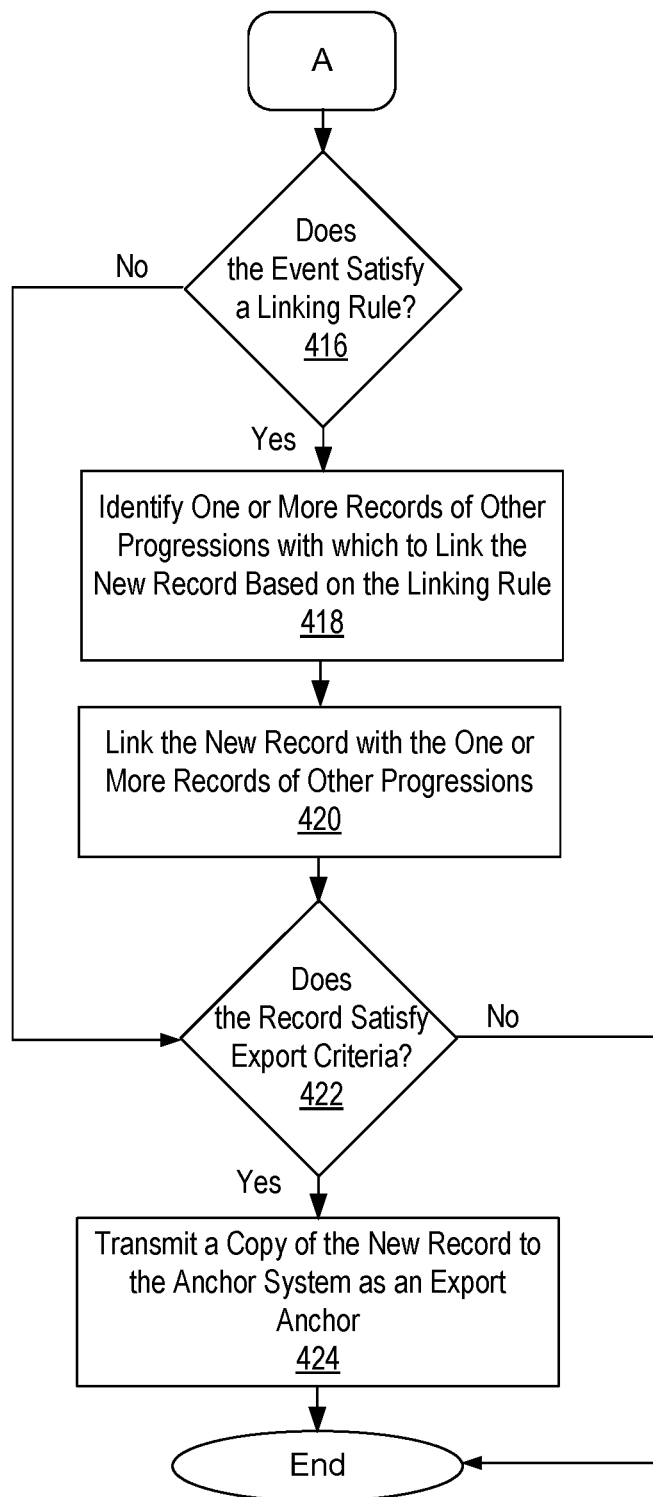

FIGS. 4A and 4B illustrate a flowchart of a process for storing data of an event related to a transaction in accordance with one embodiment. Those of skill in the art will recognize that other embodiments can perform the steps described for FIGS. 4A and 4B in different order. Moreover, other embodiments can include different and/or additional steps than the ones described.

The process starts on FIG. 4A with the data storage system 208 identifying 402 data of an event related to a transaction. The data storage system 208 stores 404 the data in the key-value database 310. The data storage system 208 further creates 406 an event signature for the event based on the data as illustrated in FIG. 1A. The data storage system 208 identifies 408 a progression created for the transaction as illustrated in FIGS. 1B and 1C. The data storage system 208 identifies 410 the transaction signature included in the last record added to the progression. The data storage system 208 creates 412 a transaction signature for the event based on hashing the identified transaction signature and the event signature created for the event. The data storage 208 adds 414 a record to the progression that includes the created transaction signature.

Continuing onto FIG. 4B, the data storage system 208 determines 416 whether the event satisfies a linking rule. If the data storage system 208 does not satisfy a linking rule, the process skips to step 422. On the other hand, if the event does satisfy a linking rule, the data storage system 208 identifies 418 one or more records of other progressions with which to link the newly added record. The storage system 208 determines based on the linking rule the records with which to link the new record. The data storage system 208 links 420 the new record with the identified one or more records of other progressions and proceeds to step 422.

At step 422, the data storage system 208 determines whether the new record satisfies export criteria. If the new record does not satisfy the export criteria, the process ends. However, if the new record satisfies the export criteria, the data storage system 208 transmits 424 a copy of the new record to the anchor system 110 as an export anchor prior to the process ending.

Figure 5:
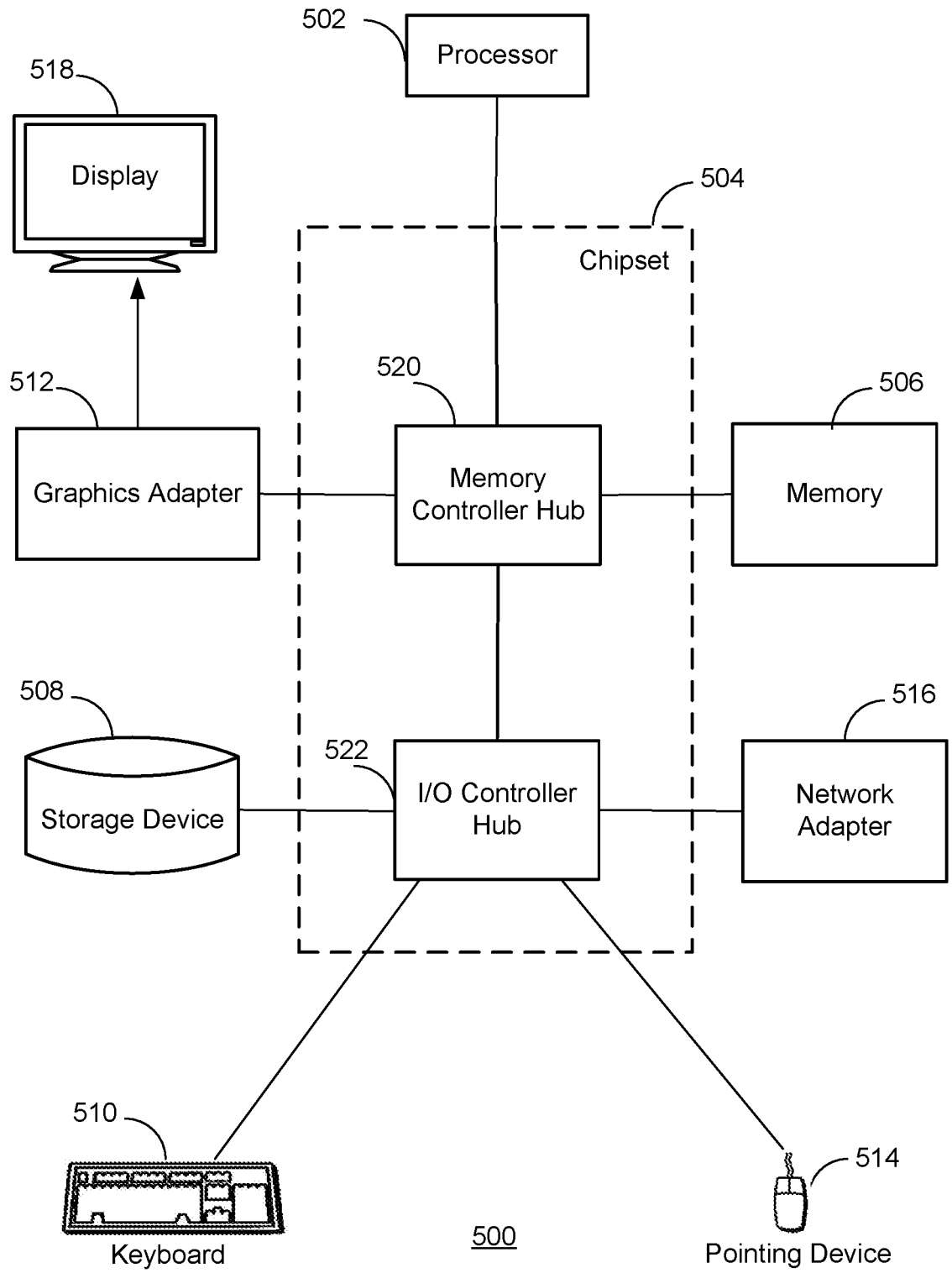
FIG. 5 is a block diagram illustrating a functional view of a typical computer system in accordance with one embodiment.

FIG. 5 is a block diagram illustrating a functional view of a typical computer system 500 for use as one of the systems illustrated in the environment 200 of FIG. 2 in accordance with one embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is a non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 500. The graphics adapter 512 displays images and other information on the display 518. The network adapter 516 couples the computer system 500 to the network 206. Some embodiments of the computer system 500 have different and/or other components than those shown in FIG. 5.

The computer 500 is adapted to execute computer program modules for providing the functionality described herein. As used herein, the term "module" to refers to computer program instruction and other logic for providing a specified functionality. A module can be implemented in hardware, firmware, and/or software. A module is typically stored on the storage device 508, loaded into the memory 506, and executed by the processor 502.

A module can include one or more processes, and/or be provided by only part of a process. Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The types of computer systems 500 used by the systems of FIG. 2 can vary depending upon the embodiment and the processing power used by the entity. Further, the foregoing described embodiments have been presented for the purpose of illustration; they are not intended to be exhaustive or to limiting to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, described modules may be embodied in software, firmware, hardware, or any combinations thereof.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. A computer implemented data storage method, comprising:
    storing, by a computer system, a plurality of progressions, each of the plurality of progressions describing a corresponding transaction and representing a timeline of events related to the corresponding transaction with a plurality of records that are chronologically and cryptographically linked;
    identifying, by the computer system, data of a latest event for a transaction;
    storing, by the computer system, the identified data, wherein the identified data comprises at least two data elements and storing the identified data comprises for each of the plurality of data elements applying a hash function to the at least two data elements to obtain at least two element hashes;
    creating, by the computer system, an event hash for the latest event based on the identified data, wherein creating the event hash comprises applying a Merkle tree hashing algorithm to the at least two element hashes for the at least two data elements of the plurality of data elements to obtain the event hash for the latest event, wherein the event hash is a single event hash;
    identifying, by the computer system from the plurality of progressions, a progression having a corresponding transaction created for the transaction, the identified progression comprising a plurality of linked records, each of the plurality of records including data for a corresponding event related to the transaction;
    creating, by the computer system, a transaction hash for the latest event based on the event hash and data included in a record from the plurality of records;
    adding, by the computer system, a record for the latest event to the identified progression including the transaction hash by chronologically and cryptographically linking the record to the identified progression;
    determining whether the added record satisfies export criteria;
    responsive to determining that the added record satisfies export criteria, transmitting a copy of the added record to an anchor system for storage as an export anchor;
    receiving, by the computer system, an import anchor transmitted from the anchor system, the import anchor created by hashing the export anchor with additional information on the added record, wherein the import anchor is stored in the anchor system in addition to being transmitted to the computer system;
    including, by the computer system, the import anchor in the added record stored in the computer system;
    retrieving an export anchor for a previous event in the identified progression from the anchor system;
    determining if a corresponding record for the previous event has been modified by comparing the export anchor for the previous event with the corresponding record for the previous event to determine whether the corresponding record has been modified if the comparison does not match;
    retrieving the export anchor for the latest event in the identified progression from the anchor system;
    determining if the added record for the latest event has been modified by comparing the export anchor for the latest event with the added record for the latest event to determine whether the added record has been modified if the comparison does not match; and
    responsive to determining that the comparison does not match, determining that the added record in the computer system has been modified after transmitting the export anchor for the added record.

2. The method of claim 1, further comprising:
    determining whether the latest event satisfies a linking rule; and responsive to determining that the latest event satisfies the linking rule, linking the added record with a record included in an additional progression, the record included in the additional progression identified based on the linking rule.

3. The method of claim 2, wherein the additional progression is from the plurality of progressions and includes records with data associated with an additional transaction different from said related transaction.

4. The method of claim 2, wherein the additional progression includes records with data associated with a process executed for the related transaction.

5. The method of claim 1, further comprising:
wherein the additional information hashed with the export anchor to create the import anchor is information unique to present time when the import anchor was created.

6. The method of claim 1, wherein the identified data comprises an identifier of a process executed for the transaction, data to which the process was applied, and a result of execution of the process.

7. The method of claim 1, wherein the plurality of records are chronologically linked based on when an event represented by each of the plurality of records occurred and the record from the plurality of records is a last record added to the progression.

8. The method of claim 1, wherein the data included in the record from the plurality of records is an additional transaction hash created based on data included in an additional record preceding the record from the plurality of records in the identified progression.

9. The method of claim 1, wherein the additional information hashed with the export anchor to create the import anchor is at least one of a block number of a block in which the export anchor is stored in the blockchain or information from a current publication.

10. The method of claim 1, wherein the at least two data elements include at least one or a combination of a data and time when the latest event occurred, identifier of a user, identifier of an executed process, and a result of the executed process.

11. A non-transitory computer readable storage medium comprising computer-executable instructions which when executed by one or more processors cause the one or more processors to perform steps comprising:
storing a plurality of progressions, each of the plurality of progressions describing a corresponding transaction and representing a timeline of events related to the corresponding transaction with a plurality of records that a chronologically and cryptographically linked;
identifying data of a latest event for a transaction;
storing the identified data, wherein the identified data comprises at least two data elements and storing the identified data comprises for each of the plurality of data elements applying a hash function to the at least two data elements to obtain at least two element hashes;
creating an event hash for the latest event based on the identified data, wherein creating the event hash comprises applying a Merkle tree hashing algorithm to the at least two element hashes for the at least two data elements of the plurality of data elements to obtain the event hash for the latest event, wherein the event hash is a single event hash;
identifying, from the plurality of progressions, a progression created for the transaction, the identified progression comprising a plurality of linked records, each of the plurality of records including data for a corresponding event related to the transaction;
creating a transaction hash for the latest event based on the event hash and data included in a record from the plurality of records;
adding a record for the latest event to the identified progression including the transaction hash by chronologically and cryptographically linking the record to the identified progression;
determining whether the added record satisfies export criteria;
responsive to determining that the added record satisfies export criteria, transmitting a copy of the added record to an anchor system for storage as an export anchor;
receiving, by the computer system, an import anchor transmitted from the anchor system, the import anchor created by hashing the export anchor with additional information on the added record, wherein the import anchor is stored in the anchor system in addition to being transmitted to the computer system;
including, by the computer system, the import anchor in the added record stored in the computer system;
retrieving an export anchor for a previous event in the identified progression from the anchor system;
determining if a corresponding record for the previous event has been modified by comparing the export anchor for the previous event with the corresponding record for the previous event to determine whether the corresponding record has been modified if the comparison does not match;
retrieving the export anchor for the latest event in the identified progression from the anchor system;
determining if the added record for the latest event has been modified by comparing the export anchor for the latest event with the added record for the latest event to determine whether the added record has been modified if the comparison does not match; and
responsive to determining that the comparison does not match, determining that the added record in the computer system has been modified after transmitting the export anchor for the added record.

12. The computer readable storage medium of claim 11, wherein the instructions further cause the one or more processors to perform steps comprising:
determining whether the latest event satisfies a linking rule; and
responsive to determining that the latest event satisfies the linking rule, linking the added record with a record included in an additional progression, the record included in the additional progression identified based on the linking rule.

13. The computer readable storage medium of claim 12, wherein the additional progression is from the plurality of progressions and includes records with data associated with an additional transaction different from said related transaction.

14. The computer readable storage medium of claim 12, wherein the additional progression includes records with data associated with a process executed for the related transaction.

15. The computer readable storage medium of claim 11, wherein the additional information hashed with the export anchor to create the import anchor is information unique to present time when the import anchor was created.

16. The computer readable storage medium of claim 11, wherein the additional information hashed with the export anchor to create the import anchor is at least one of a block number of a block in which the export anchor is stored in the blockchain or information from a current publication.

17. The computer readable storage medium of claim 11, wherein the at least two data elements include at least one or a combination of a data and time when the latest event occurred, identifier of a user, identifier of an executed process, and a result of the executed process.

\* \* \* \* \*